United States Patent
Khafagy et al.

(10) Patent No.: US 10,059,328 B2
(45) Date of Patent: Aug. 28, 2018

(54) SYSTEM AND METHOD TO CONTROL BATTERY CURRENT DURING ROLLING STOP-START EVENTS

(71) Applicant: FORD GLOBAL TECHNOLOGIES, LLC, Dearborn, MI (US)

(72) Inventors: Hafiz Shafeek Khafagy, Dearborn, MI (US); Mark Douglas Malone, Canton, MI (US); Birgit Lisa Sorgenfrei, Livonia, MI (US); Essam Mohamed, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/234,609

(22) Filed: Aug. 11, 2016

(65) Prior Publication Data

US 2018/0043878 A1    Feb. 15, 2018

(51) Int. Cl.
| | |
|---|---|
| *B60W 20/15* | (2016.01) |
| *B60W 10/06* | (2006.01) |
| *F02D 41/06* | (2006.01) |
| *F02D 41/26* | (2006.01) |
| *B60W 10/08* | (2006.01) |
| *B60W 10/18* | (2012.01) |
| *F02D 41/04* | (2006.01) |

(52) U.S. Cl.
CPC ............ *B60W 20/15* (2016.01); *B60W 10/06* (2013.01); *B60W 10/08* (2013.01); *B60W 10/18* (2013.01); *F02D 41/042* (2013.01); *F02D 41/065* (2013.01); *F02D 41/26* (2013.01); *B60W 2510/0638* (2013.01)

(58) Field of Classification Search
CPC ...... B60W 20/15; B60W 10/18; B60W 10/08; B60W 10/06; B60W 2510/0638; F02D 41/065; F02D 41/042; F02D 41/26
See application file for complete search history.

(56) References Cited

U.S. PATENT DOCUMENTS

| | | |
|---|---|---|
| 6,675,088 B2 | 1/2004 | Miki |
| 6,817,329 B2 | 11/2004 | Buglione et al. |
| 7,389,842 B2 | 6/2008 | Inoguchi et al. |
| 7,702,450 B2 | 4/2010 | Pfohl et al. |
| 8,256,399 B2 | 9/2012 | Gamache et al. |
| 8,316,810 B2 | 11/2012 | Holz et al. |
| 8,727,067 B2 | 5/2014 | Gibson et al. |
| 8,875,857 B2 | 11/2014 | Asplund |
| 9,284,896 B2 | 3/2016 | Atluru et al. |
| 2015/0105974 A1 | 4/2015 | Kleve et al. |
| 2015/0149014 A1* | 5/2015 | Kees .................. B60L 1/00 701/22 |
| 2015/0258948 A1 | 9/2015 | Planas et al. |
| 2016/0047471 A1* | 2/2016 | Lundberg ......... F16H 61/0031 701/53 |
| 2016/0369733 A1* | 12/2016 | Dokras .............. B60R 16/0236 |

FOREIGN PATENT DOCUMENTS

JP          3141112 U       4/2008

* cited by examiner

*Primary Examiner* — Rodney A Butler
(74) *Attorney, Agent, or Firm* — David Kelley; Brooks Kushman P.C.

(57) ABSTRACT

A vehicle includes an engine and a controller configured to autostop and autostart the engine. Engine autostops are conditioned on a vehicle speed condition. In addition, engine autostops are conditioned on a battery current threshold that changes as the speed of the vehicle changes.

17 Claims, 4 Drawing Sheets

SYSTEM AND METHOD TO CONTROL BATTERY CURRENT DURING ROLLING STOP-START EVENTS

TECHNICAL FIELD

This application generally relates to controlling engine autostart/autostop in hybrid vehicles.

BACKGROUND

A micro-hybrid vehicle may automatically stop its internal combustion engine for a period of time when particular conditions are met. Automatic engine stops may improve fuel economy by reducing the amount of time the engine is idling while the vehicle is at standstill or coasting to a stop.

SUMMARY

A vehicle includes an engine and a traction battery. The vehicle further includes a controller programmed to, in response to vehicle speed being less than a speed threshold and demand current from the traction battery being less than a current threshold that changes with the vehicle speed, permit autostopping of the engine.

A vehicle includes an engine and a traction battery. The vehicle further includes a controller programmed to, in response to the engine being autostopped and a brake actuation parameter being greater than a predetermined value that is expected to cause a demand current of the traction battery to exceed a predetermined autostart threshold, inhibit autostarting of the engine for a predetermined duration.

A method includes permitting, by a controller, autostopping of an engine in response to vehicle speed being less than a speed threshold and a current demanded from a traction battery being less than a current threshold that changes with the vehicle speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
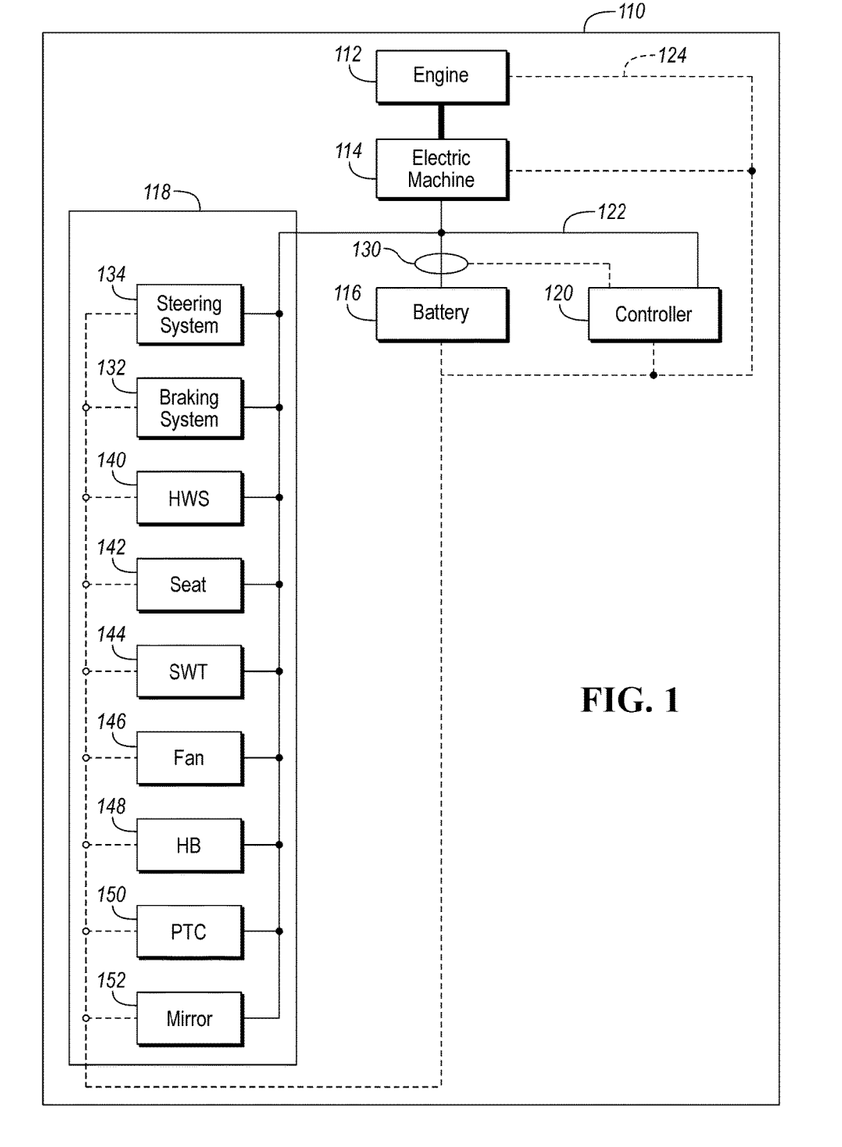
FIG. 1 is a block diagram for a micro-hybrid vehicle.

Referring to FIG. 1, a micro-hybrid vehicle 110 may include an engine 112, an electric machine 114 that may be referred to as an alternator or integrated starter generator, a battery 116 (e.g., a 12 V battery), electrical loads 118 (e.g., pumps of a climate control system, a power steering assist system, etc.) in communication with/under the control of at least one controller 120 (as indicated by dashed line). The engine 112 is mechanically connected with the electric machine 114 (as indicated by heavy line) such that the engine 112 may drive the electric machine 114 to generate electric current. The electric machine 114 and battery 116 are electrically connected with each other and the electrical loads 118 (as indicated by thin line) via a power network 122. The power network 122 may be a series of conductors electrically interconnecting the components. The power network 122 may include power and ground signals. Hence, the electric machine 114 may charge the battery 116; the electrical loads 118 may consume electric current provided by the electric machine 114 and/or battery 116.

The electrical loads 118 may include one or more of a heated windshield (HWS) 140, heated/cooled seats 142, a steering wheel thermal system (SWT) 144, an air-conditioning fan 146, a heated backlight 148, heated mirrors 152, a positive temperature coefficient (PTC) 150 heating device. Each of the electrical loads 118 may have an associated controller that controls and manages operation of the device. Note that other devices may be electrically connected to the power network 122 and may be considered as electrical loads 118.

The controller 120 may initiate an autostop or autostart of the engine 112. As the vehicle 110 comes to a stop, for example, the controller 120 may issue a command to begin the process to stop the engine 112, thus preventing the electric machine 114 from providing electric current to the electrical loads 118. The battery 116 may provide electric current to the electrical loads 118 while the engine 112 is stopped. As a brake pedal (not shown) is disengaged (and/or an accelerator pedal (not shown) is engaged) after an engine autostop, the controller 120 may issue a command to begin the process to start the engine 112, thus enabling the electric machine 114 to provide electric current to the electrical loads 118.

The controller 120 may monitor conditions for starting and stopping of the engine 112 during an ignition cycle. The controller 120 may check various conditions for determining when to autostop the engine 112 to improve fuel economy. For example, during a brake application the engine 112 may be autostopped. The controller 120 may also check various conditions for determining when to autostart the engine 112. For example, when an operator releases the brake pedal, the engine 112 may be autostarted. The controller 120 may be coupled to the battery 116, the electrical loads 118, the electric machine 114, and the engine 112 via a control network 124. The control network 124 may include discrete hardware connections between modules. The control network 124 may include a communications network in which the modules may communicate serially. In some configurations, the controller 120 may coordinate the operation of multiple controllers to perform autostop and autostart of the engine 112. For example, an engine controller may communicate with the controller 120 via the communications network (e.g., Controller Area Network (CAN)).

The vehicle 110 may include a current sensor 130 that is configured to measure the current flowing to and from the battery 116. For example, the current sensor 130 may be Hall-effect sensor having an output that is electrically coupled to the controller 120. The current sensor 130 may provide a signal to the controller 120 that is indicative of the battery current magnitude and direction. The controller 120 may include circuitry to filter the signal and convert the signal to digital form for processing.

The electrical loads 118 may be coupled to the controller 120 by control signals or via the control network 124. The controller 120 may be programmed to control operation of the electrical loads 118. Controlling the electrical loads 118 may include activating and deactivating the electrical loads 118. The electrical loads 118, when in an activated state, may draw current from the power network 122. A magnitude of the current may depend upon the amount of time after activation. For a period of time immediately following activation, the current may be in a transient phase. The transient phase includes an inrush current that may be a transient current that may be greater than a steady-state rated current value. Some of the electrical loads 118 may be characterized by the inrush current. For example, electric motors and transformers, light bulbs, and power converters may exhibit a high inrush current.

The activation status of the electrical loads 118 may be communicated via the control network 124 to the controller 120. For example, a signal in a serial data message may indicate the on/off status of the electrical loads 118. The controller 120 may receive a signal indicative of an activation state of the electrical loads 118. A transition in value of this signal may indicate when the electrical loads 118 have changed activation status. To detect a transition from a deactivated state to an activated state, the controller 120 may monitor this signal for the appropriate change in value. The controller 120 may receive a signal indicative of the level of activation of the electrical loads 118. The control network 124 may include analog signals for communicating status of the electrical loads 118.

Figure 2:
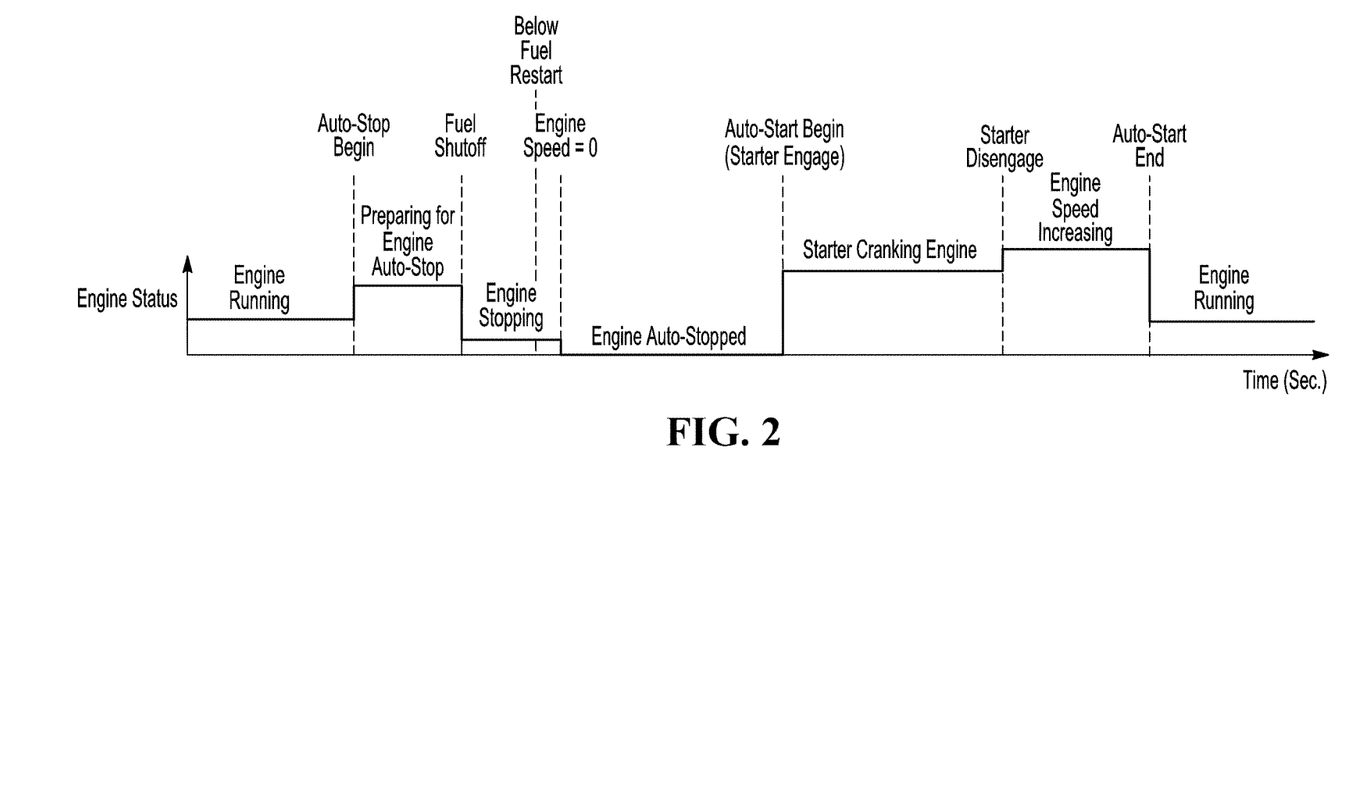
FIG. 2 is a plot of engine status versus time before, during and after an engine stop/start event.

Referring to FIG. 2, an engine autostop event may include several stages: "autostop begin," which marks the beginning of the engine autostop event; "preparing for engine autostop," which is the time period during which vehicle systems as well as the engine are prepared for the impending engine stop (if an autostop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed reduces to zero; "below fuel restart," which marks the point after which if a restart is requested during the "engine stopping" stage, the starter may need to be engaged to crank the engine (if a restart is requested before "below fuel restart" and during the "engine stopping" stage, the engine may be restarted by turning the flow of fuel back on); "engine speed=0," which marks the point at which the engine speed is near or equal to zero; "engine autostopped," which is the time period during which the engine is off; "starter engage," which marks the point at which the starter starts to crank the engine in an effort to start the engine (in response to detecting an engine autostart condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed (a speed at or above target idle speed); and, "autostart end," which marks the point at which the speed of the engine achieves its running speed.

The controller 120 may be programmed to implement a variety of strategies for autostarting and autostopping the engine 112. For example, the engine 112 may be autostopped during braking events or when the vehicle 110 is in a park mode. An engine autostop may also be conditioned on the vehicle speed such that an engine autostop may be initiated when the vehicle speed falls below a predetermined speed. The engine autostop may be conditioned on the battery current such that an engine autostop is initated when battery current is less than a predetermined engine autostop current threshold.

Conditions for autostarting the engine 112 may include the current drawn from the battery exceeding an engine autostart current threshold. The engine autostop current threshold and the engine autostart current threshold may be different (e.g., hysteresis) to avoid rapid on/off cycling of the engine 112.

To improve fuel economy, it may be desirable to expand the conditions in which the engine 112 may be autostopped. However, these conditions must be compatible with other factors such as drivability, safety, and comfort. One method of expanding the engine autostop mode is to implement a rolling start-stop (RSS) function. The RSS function may permit the engine 112 to autostop at higher speeds. Battery power must be managed during engine autostops and autostarts to ensure that electrical loads 118 can be operated.

While the engine 112 is running (e.g., engine autostarted), a decision may be made as to when to permit an engine autostop when conditions to request an engine autostop are satisfied. Permission for an engine autostop may be conditioned on satisfaction of certain vehicle speed conditions. For example, an engine autostop may be conditioned on vehicle speed being less than a predetermined speed threshold. The predetermined speed threshold may be selected to ensure that the engine does not turn off at high speeds. Permission for an engine autostop may be further conditioned on satisfaction of certain battery current conditions. For example, an engine autostop may be conditioned on the battery current being less than a predetermined autostop current threshold. The predetermined autostop current threshold may be selected to ensure that the battery 116 can support the current requirements of the electrical loads 118 during the engine autostop state. Other conditions may include a state of charge of the battery 116 being above a threshold.

A control strategy may be devised in which engine autostops are divided into multiple regions based on vehicle speed. For example, two regions may be defined—a rolling region and a static region. The static region may correspond to a speed range near zero speed. For example, a static region speed threshold may be selected as 4 kilometers/hour. The rolling region may correspond to a speed range in which a rolling autostop/start may be performed. For example, a speed threshold for the rolling region may be selected as 50 kilometers/hour. The rolling region may include the range of speeds between the rolling region speed threshold and the static region speed threshold.

Each region may also define an associated battery current threshold below which the engine may be autostopped. The battery current threshold may change with vehicle speed. The battery current threshold associated with the rolling region may be greater than the battery current threshold associated with the static region. For example, the battery current threshold associated with the rolling region may be selected as 80 Amps and the battery current threshold associated with the static region may be selected as 70 Amps. In the following examples, two regions are defined but additional regions with associated thresholds may also be defined. The battery current threshold may change as a function of vehicle speed. For example, as the vehicle speed decreases, the battery current threshold may be decrease. In some implementations, the battery current threshold may change at discrete vehicle speed thresholds. In these implementations, the battery current threshold may decrease at least once as the vehicle speed decreases.

The decision to permit an engine autostop may be based on the vehicle speed and battery current thresholds corresponding to the operating region (rolling or static). For example, when the vehicle speed is above the speed threshold for the rolling region, the engine 112 may be maintained in a running state. That is, engine autostops may be inhibited. When the vehicle speed falls below the rolling region speed threshold but is above the static region speed threshold, the battery current may be compared to the rolling region battery current threshold. If the battery current is less than the rolling region battery current threshold, an engine autostop may be permitted. If the battery current is greater than or equal to the rolling region battery current threshold, an engine autostop may be inhibited. That is, the engine 112 may remain in a running state.

When the vehicle speed falls below the static region speed threshold, the battery current may be compared to the static region battery current threshold. If the battery current is less than the static region battery current threshold, an engine autostop may be permitted. If the battery current is greater than or equal to the static region battery current threshold, an engine autostop may be inhibited.

When the battery current is greater than the battery current threshold but other conditions are permissive of an engine autostop, a load shedding feature may be initiated. During load shedding, engine autostops may be inhibited. The load shedding feature may reduce current to at least one of the electrical loads 118 to cause the battery current to fall below the threshold. During load shedding the current to selected electrical loads 118 may be reduced. In some cases, one or more of the electrical loads 118 may be temporarily deactivated to reduce current draw. Load shedding may be applied to any of the electrical loads 118, including the HWS 140, the heated/cooled seats 142, the heated/cooled steering wheel 144, the air-conditioning fan 146, the heated backlight 148, the heated mirrors 152, and the PTC heating device 150. The load shedding may be applied to any non-essential electrical loads in the vehicle 110. The load shedding may be applied to those electrical loads 118 that are not necessary for safety and/or drivability. For example, the load shedding may be applied to climate control related electrical loads as these are related to occupant comfort and a temporary reduction to these loads may not greatly impact comfort. The electrical loads 118 may be deactivated or operated at a reduced current level during the load shedding. For example, the current to the electrical loads may be decreased to a predetermined percentage of the previous operating current level.

An additional feature of the load shedding is that the controller 120 may store the current level for affected electrical loads 118 prior to initiating the load shedding process. During load shedding and engine autostop, the electrical loads 118 may be operated at a reduced current level. The engine 112 may later be autostarted when the appropriate autostart conditions are present. After the engine 112 is running again (e.g., autostart completed), the current level of the electrical loads 118 may be restored to the pre-engine autostop levels. In this manner, electrical load current is reduced immediately prior to and during an engine autostop to allow the engine autostop to occur and be maintained. Upon restarting the engine 112, the current to the electrical loads 118 may be returned to the previous operating levels.

The electrical loads 118 may have an associated indicator that provides feedback to vehicle occupants as to the operational state of the load. An indicator light or display may be present within view of the driver and/or passenger that provides a visual signal when the associated electrical load is activated. For example, the heated backlight 148 may have an associated lamp that illuminates when the heated backlight 148 is activated. During the load shedding, current to the heated backlight 148 may be reduced. During the load shedding, the associated status lamp may continue to be illuminated. By operating the indicators in this manner, there is no distracting on/off cycling of the indicator. Further, by maintaining the indicator in the illuminated state, the vehicle occupants are alerted as to the desired operational status of the associated electrical load. In effect, the indicator provides an indication of the desired operational status of the associated electrical load even though the actual current draw may temporarily be at a reduced level.

The load shed strategy may depend on the whether the vehicle 110 is operating in the rolling region or the static region. In the static region (e.g., vehicle speed less than static region speed threshold), load shedding may be more aggressive. That is, current may be reduced by a larger amount in the static region than in the rolling region. A load shed percentage may change with vehicle speed. For example, in the rolling region, the current to the HWS 140 may be reduced to 30% of the original value on the driver side and 15% of the original value on the passenger side. In the static region, the current to the HWS 140 may be reduced to 15% of the original value on the driver side and 10% of the original value on the passenger side.

In the rolling region, when the vehicle speed and brake applied conditions are satisfied, the load shedding may be initiated for a predetermined delay time. The predetermined delay time may be selected as a period of time sufficient to reduce the battery current by a predetermined amount. During load shedding, electrical loads 118 may be commanded to reduce current draw from the battery 116. For example, the HWS 140 may be requested to reduce current from the previous operating value. The heated/cooled seats 142 may be commanded to turn off during the load shed and autostop period. The heated/cooled steering wheel 144 may be commanded to turn off during the load shed and autostop period. The AC fan 146 may be commanded to reduce speed during the load shed and autostop period. The heated backlight 148 may be commanded to turn off during the load shed and autostop period. The heated mirrors 152 may be commanded to turn off during the load shed and autostop period. The PTC heater 150 may be command to turn off during the load shed and autostop period.

If within the predetermined delay time, the battery current falls below the rolling region battery current threshold, the engine 112 may be autostopped. When the engine is autostopped, the controller 120 may monitor for conditions to restart the engine 112. For example, the controller 120 may monitor the battery current to detect when it rises above the battery current autostart threshold. The controller 120 may impose a delay time between transitioning from the autostop to the autostate state. That is, the autostart may be initiated after the battery current exceeds the current autostart threshold for a predetermined amount of time.

The controller 120 may monitor the electrical loads 118 to determine the source of an increase in current draw. Each of the electrical loads 118 may monitor the amount of current being used and report that amount to the controller 120. Alternatively, the electrical loads 118 may transmit activation information to the controller 120 and the controller 120 may determine the associated current. For example, the controller 120 may maintain a table of expected load currents for various operating states of each of the electrical loads 118.

One of the electrical loads 118 may be a steering control system 134 that controls and activates a steering mechanism for the vehicle 110. The controller 120 may monitor steering actuation parameters such as steering wheel angle and rate of change of the steering wheel angle. The controller 120 may detect a steering actuation that may be expected to cause the demand current of the traction battery to exceed the battery current autostart threshold. A steering actuation that may cause a large demand current can occur during an aggressive steering event. For example, the controller 120 may receive a steering wheel angle signal from a steering wheel angle sensor associated with the steering control system 134. If the magnitude of the steering wheel angle exceeds a predetermined magnitude (e.g., +/−275 degrees), an aggressive steering event may be inferred. In addition, if a rate of change of the steering wheel angle exceeds a predetermined rate (e.g., 180 degrees/second), an aggressive steering event may be inferred. During an aggressive steering event, the steering control system 134 may be expected to operate at higher current levels.

During an autostop condition, the battery current may rise above the battery current autostart threshold during the steering actuation. The controller 120 may delay autostarting of the engine 112 for a predetermined duration. If the steering actuation persists longer than the predetermined duration and the battery current remains above the battery current autostart threshold, then the engine 112 may be autostarted. The controller 120 may monitor the steering actuation by monitoring a power or current demand of the steering control system 134. The current demand of the steering control system 134 may be subtracted from the total traction battery current demand to determine a current demand excluding the steering control system 134. If the total traction battery current demand excluding the steering control system 134 is less than the battery current autostart threshold, then the steering control system current demand may be causing the total demand current to exceed the battery current autostart threshold.

One of the electrical loads 118 may be a braking control system 132 that controls and activates various features associated with the braking system. Such features may include brake application, traction control, and/or stability control. The controller 120 may monitor for brake actuation parameters that may be expected cause the traction battery demand current to exceed the battery current autostart threshold. The brake actuation parameters may include a brake pedal travel, a vehicle deceleration, and status of automatic features such as stability control. A brake actuation that causes a large current demand may occur during an aggressive braking event. For example, the controller 120 may receive a brake pedal travel signal from a brake pedal travel sensor associated with the braking control system 132. If the brake pedal travel signal exceeds a predetermined amount of travel, an aggressive braking event may be inferred. In addition, activation of automatic control functions involving the brakes may be deemed to be aggressive braking events. The controller 120 may receive or compute a vehicle deceleration signal that may be derived from an acceleration sensor mounted in the vehicle 112.

The controller 120 may monitor the brake actuation by monitoring a power or current demand of the braking control system 132. The current demand of the braking control system 132 may be subtracted from the total traction battery current demand to determine a current demand excluding the braking control system 132. If the total traction battery current demand excluding the braking control system 132 is less than the battery current autostart threshold, then the braking control system current demand may be causing the total demand current to exceed the battery current autostart threshold.

During an autostop condition, the battery current may rise above the battery current autostart threshold during a brake actuation. The controller 120 may delay autostarting of the engine 112 for a predetermined duration. If the braking actuation that causes the total traction battery demand current to exceed the battery current autostart threshold persists longer than the predetermined duration and the battery current remains above the battery current autostart threshold, then the engine 112 may be autostarted.

During an autostop condition, the battery current may remain below the battery current autostart threshold. The controller 120 may monitor for the presence of an aggressive steering event and an aggressive braking event that causes the total battery demand current to exceed the battery current autostart threshold. An aggressive breaking event may be detected by a brake actuation parameter that is greater than a predetermined braking parameter. The brake actuation parameter may be based on the brake pedal travel and/or the vehicle deceleration. An aggressive steering event may be detected by a steering actuation parameter that is greater than a predetermined steering parameter. The steering actuation parameter may be the steering wheel angle and/or a rate of change of the steering wheel angle. In the event of detecting both an aggressive steering event and an aggressive braking event, the engine may be autostarted without delay. Such a response ensures that the engine 112 is running to provide power to the steering control system 134 and the braking control system 132. In addition, autostarting the engine 112 may improve the vehicle performance during these events as the associated systems can respond immediately to driver commands.

Figure 3:
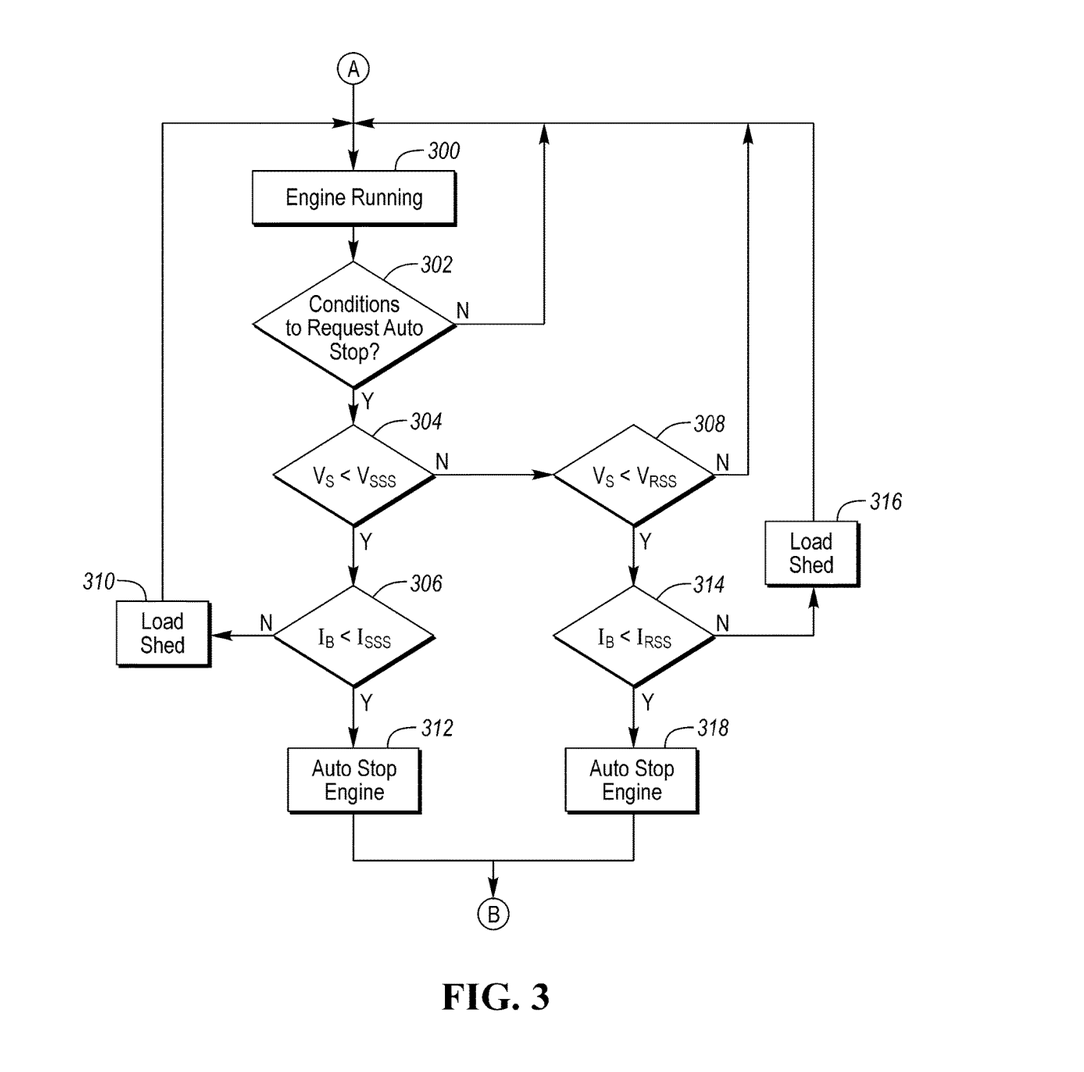
FIG. 3 is a flowchart for a possible sequence of operations to be executed while the engine is running.

FIG. 3 depicts a flow chart for a sequence of possible operations that may be implemented in the controller 120 when the engine is in a running or autostarted state. At operation 300, the engine is in a running or autostarted state. At operation 302, conditions for requesting an autostop of the engine are examined. For example, possible conditions may include application of the brake pedal as determined by a value of the brake pedal travel sensor. Other conditions may be based on a position of the accelerator pedal as measured by an accelerator pedal travel sensor. If conditions to request an engine autostop are not present, the system remains in the engine running state at operation 300. If conditions to request an engine autostop are present, operation 304 is executed.

At operation 304, the vehicle speed is compared to the static start/stop speed threshold. If the vehicle speed is less than the static start/stop speed threshold, operation 306 may be executed. At operation 306, the battery current is compared to the static start/stop current threshold. If the battery current is less than the static start/stop current threshold, operation 312 is executed. At operation 312, the controller implements instructions to autostop the engine. If the battery current is greater than the static start/stop threshold, operation 310 is executed. At operation 310, the controller implements instructions for load shedding. The load shedding includes reducing current to electrical loads as discussed previously. Execution returns to operation 300 to maintain the engine in the running condition.

At operation 304, if the vehicle speed is greater than or equal to the static start/stop speed threshold, operation 308 is executed. At operation 308, the vehicle speed is compared to the rolling start/stop speed threshold. If the vehicle speed is greater than or equal to the rolling start/stop speed threshold, execution returns to operation 300 to maintain the engine in the running state. If the vehicle is less than the rolling start/stop speed threshold, operation 314 is executed. At operation 314, the battery current is compared to the rolling start/stop current threshold. If the battery current is less than the rolling start/stop current threshold, operation 318 is executed to autostop the engine. If the battery current is greater than or equal to the rolling start/stop threshold, operation 316 is executed. At operation 316, the controller implements instructions for load shedding. The load shedding includes reducing current to electrical loads as discussed previously. For example, current may be reduced to at least one predetermined electrical load by a predetermined percentage. Execution returns to operation 300 to maintain the engine in the running condition.

Figure 4:
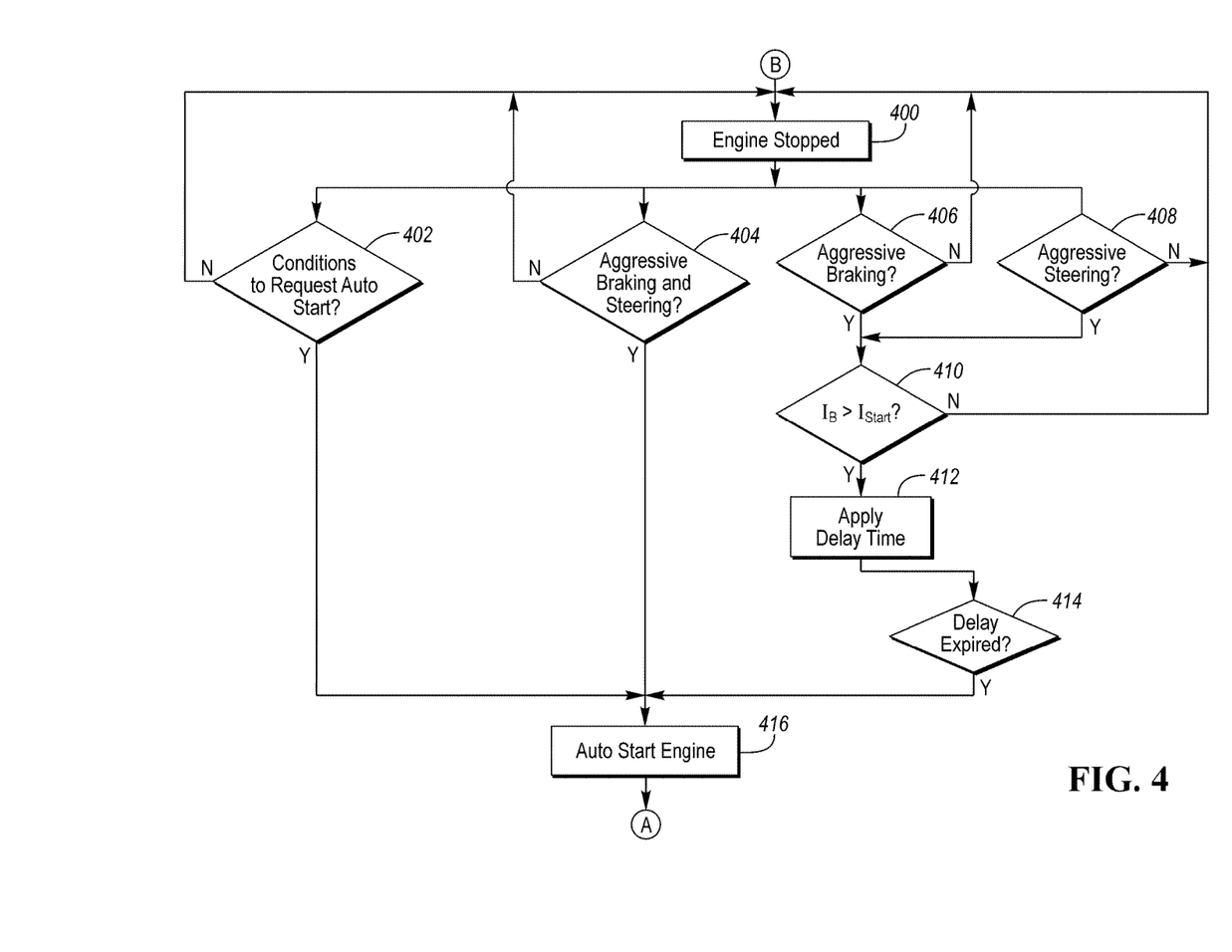
FIG. 4 is a flowchart for a possible sequence of operations to be executed while the engine is autostopped.

FIG. 4 depicts a flow chart for a sequence of possible operations that may be implemented in the controller 120 when the engine is in an off or autostopped state. At operation 400, the engine is in an autostopped state. At operation 402, conditions for requesting and engine autostart are checked. For example, an engine autostart may be requested when the accelerator pedal travel is above a threshold. An engine autostart may be requested when the controller detects that the brake pedal is released. If the conditions to request an engine autostart are satisfied, operation 416 is executed. At operation 416, instructions are executed to autostart the engine.

At operation 404, a check is made for the presence of an aggressive steering event and an aggressive braking event. An aggressive steering event may be detected in response to a rate of change of a steering wheel angle exceeding a predetermined rate and/or in response to a magnitude of a steering wheel angle exceeding a predetermined magnitude. An aggressive braking event may be detected in response to a vehicle deceleration exceeding a predetermined deceleration and/or in response to a brake pedal travel exceeding a predetermined amount of travel. If both an aggressive steering event and an aggressive braking event are present, operation 416 may be executed to autostart the engine.

At operation 406, a check is made for the presence of an aggressive braking event. If an aggressive braking event is present, operation 410 may be executed. At operation 410, the battery current is compared to an engine autostart current threshold. If the battery current is greater than the engine autostart current threshold, operation 412 is executed. At operation 412, a delay time is implemented. For example, at the first occurrence of the battery current exceeding the engine autostart threshold, a timer may be initialized and incremented on subsequent occurrences of the condition being satisfied. At operation 414, a check is made to determine if the delay time has expired. If the delay time has expired, operation 416 is executed to autostart the engine. The delay time has the effect of inhibiting engine autostarting for the duration of the delay time.

At operation 408, a check is made for the presence of an aggressive steering event. If an aggressive steering event is present, operation 410 may be executed. At operation 410, the battery current is compared to an engine autostart current threshold. If the battery current is greater than the engine autostart current threshold, operation 412 is executed. At operation 412, a delay time is implemented. For example, at the first occurrence of the battery current exceeding the engine autostart threshold, a timer may be initialized and incremented on subsequent occurrences of the condition being satisfied. At operation 414, a check is made to determine if the delay time has expired. If the delay time has expired, operation 416 is executed to autostart the engine.

If neither an aggressive steering event nor an aggressive braking event is detected, operation 400 is performed to remain in the engine autostopped state. Operation 402, operation 404, operation 406, and operation 408 are depicted in parallel but may be implemented in series without altering the results.

Permitting engine autostop at higher speeds can improve fuel economy. In addition, including both rolling region and static region current thresholds allows engine autostops tailored for current demands of each region. Monitoring current draw during aggressive braking and steering events enables the engine to be autostarted quickly during extreme vehicle maneuvers.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
a battery; and
a controller programmed to, responsive to vehicle speed being less than a speed threshold, permit autostopping the engine responsive to demand current from the battery being less than a current threshold that changes with vehicle speed and reduce current flowing to a predetermined electrical load by a predetermined percentage to cause demand current to fall below the current threshold responsive to demand current exceeding the current threshold.

2. The vehicle of claim 1 wherein the current threshold decreases at least once as the vehicle speed decreases.

3. The vehicle of claim 1 wherein the controller is further programmed to, in response to detecting a brake actuation during an autostop of the engine that causes the demand current to exceed an engine autostart threshold for greater than a predetermined duration, initiate autostarting of the engine.

4. The vehicle of claim 1 wherein the controller is further programmed to, in response to detecting a steering actuation during an autostop of the engine that causes the demand current to exceed an engine autostart threshold for greater than a predetermined duration, initiate autostarting of the engine.

5. The vehicle of claim 1 wherein the controller is further programmed to, in response to detecting, during an autostop of the engine, a brake actuation parameter greater than a predetermined braking parameter and a steering actuation parameter greater than a predetermined steering parameter, initiate autostarting of the engine.

6. The vehicle of claim 1 wherein the controller is further programmed to, in response to the engine being autostarted, restore current to the predetermined electrical load to a current level that was present before reducing current.

7. The vehicle of claim 1 wherein the controller is further programmed to, in response to the vehicle speed being less than a second speed threshold that is less than the speed threshold and the demand current exceeding the current threshold associated with the second speed threshold, reduce current flowing to the predetermined electrical load by a second predetermined percentage that is greater than the predetermined percentage to cause the demand current to fall below the current threshold.

8. A vehicle comprising:
an engine;
a battery; and
a controller programmed to, responsive to the engine being autostopped and one of a pair of parameters, one associated with brake actuation and one associated with steering actuation, exceeding corresponding predetermined values expected to cause an autostart of the engine, inhibit autostarting of the engine for a predetermined duration and, responsive to both of the parameters exceeding the corresponding predetermined values, autostart the engine.

9. The vehicle of claim 8 wherein the one of the parameters associated with brake actuation is a deceleration of the vehicle.

10. The vehicle of claim 8 wherein the one of the parameters associated with brake actuation is a brake pedal travel.

11. The vehicle of claim 8 wherein the one of the parameters associated with steering actuation is a rate of change of a steering wheel angle.

12. The vehicle of claim 8 wherein the one of the parameters associated with steering actuation is a magnitude of a steering wheel angle.

13. A method comprising:
responsive to vehicle speed being less than a speed threshold, permitting, by a controller, autostopping of an engine responsive to a current demanded from a battery being less than a current threshold that changes with vehicle speed and reducing current flowing to a predetermined electrical load by a predetermined percentage to cause the current demanded to fall below the current threshold responsive to the current demanded exceeding the current threshold.

14. The method of claim 13 further comprising inhibiting, by the controller, autostarting of the engine for a predetermined duration in response to the current demanded being greater than an engine autostart threshold in a presence of a brake actuation parameter being greater than a predetermined value while the engine is autostopped.

15. The method of claim 13 further comprising inhibiting, by the controller, autostarting of the engine for a predetermined duration in response to the current demanded being greater than an engine autostart threshold in a presence of a steering actuation parameter being greater than a predetermined value while the engine is autostopped.

16. The method of claim 13 further comprising initiating, by the controller, autostarting of the engine in response to a brake actuation parameter being greater than a predetermined value and a steering actuation parameter being greater than a predetermined level while the engine is autostopped.

17. The method of claim 13 wherein the current threshold decreases at least once as the vehicle speed decreases.

* * * * *